J. L. GRAHAM.
CULTIVATOR.
APPLICATION FILED JUNE 3, 1912.
1,132,842.
Patented Mar. 23, 1915.
3 SHEETS—SHEET 2.
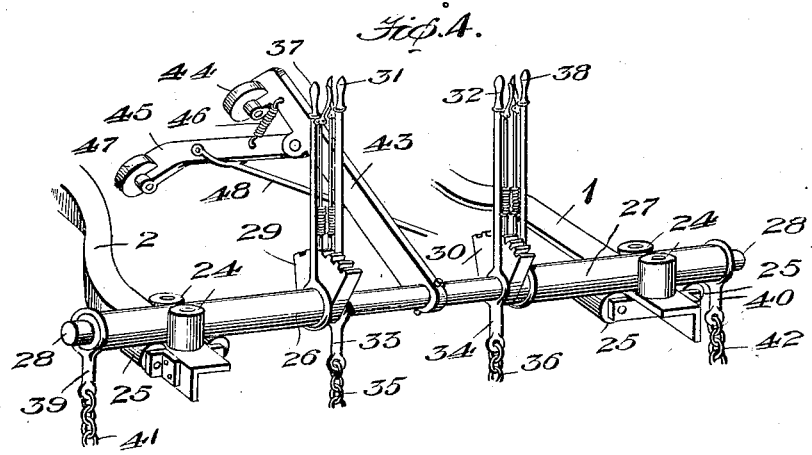
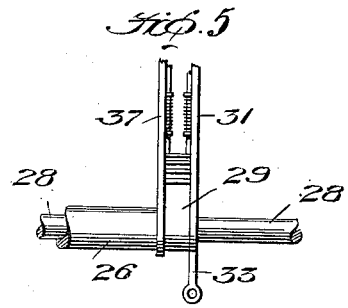
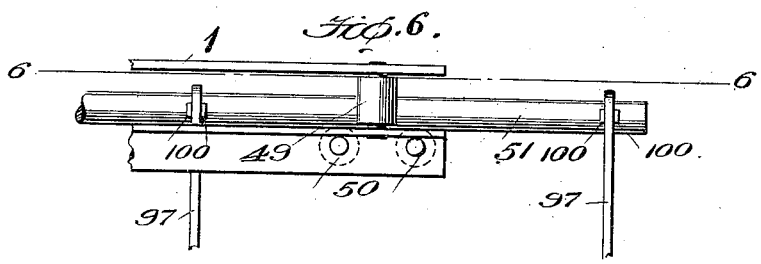
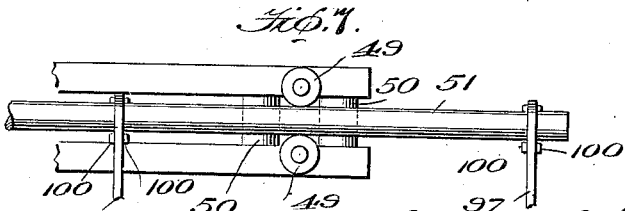

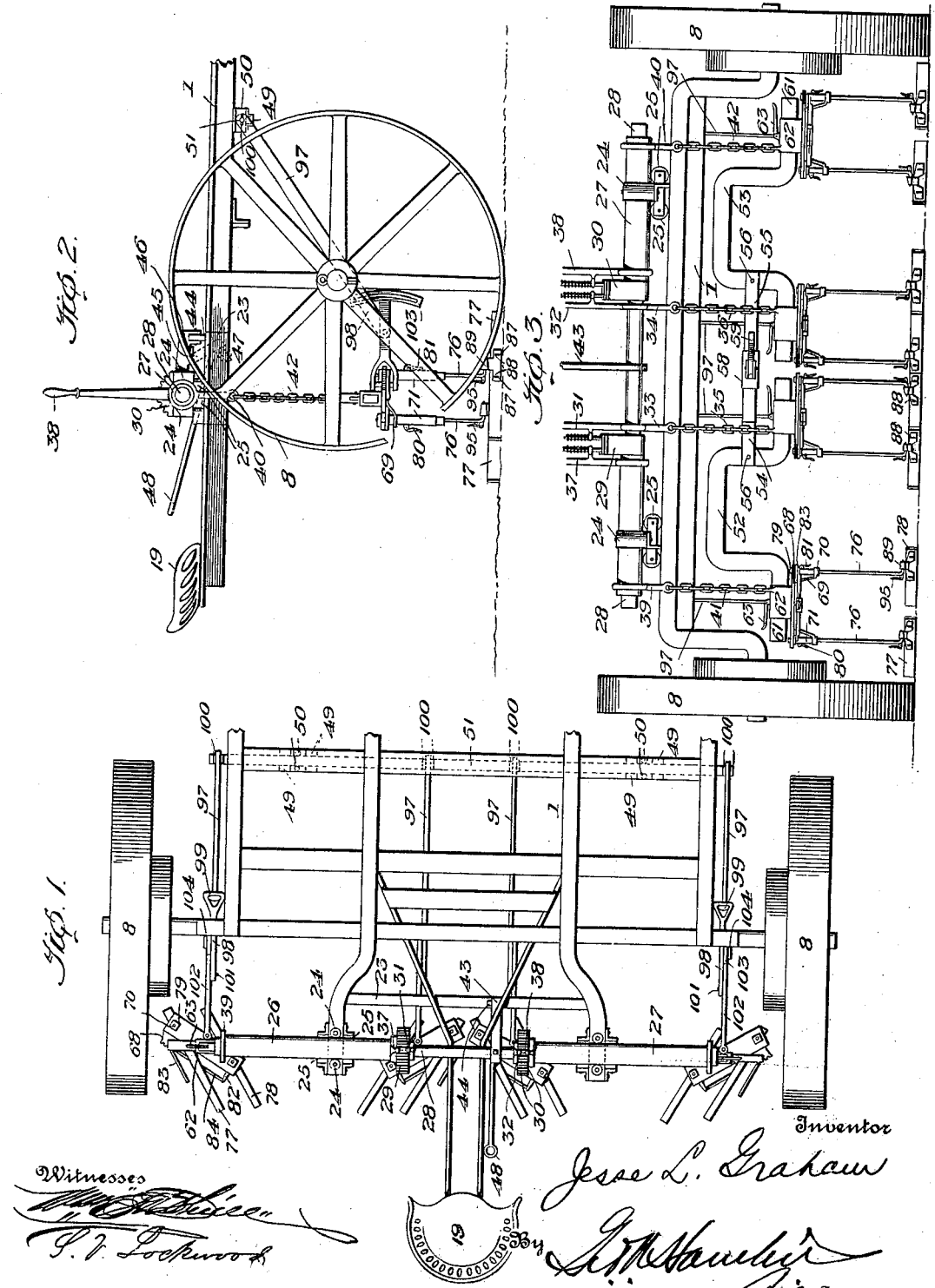

J. L. GRAHAM.
CULTIVATOR.
APPLICATION FILED JUNE 3, 1912.
1,132,842.
Patented Mar. 23, 1915.
3 SHEETS—SHEET 3.
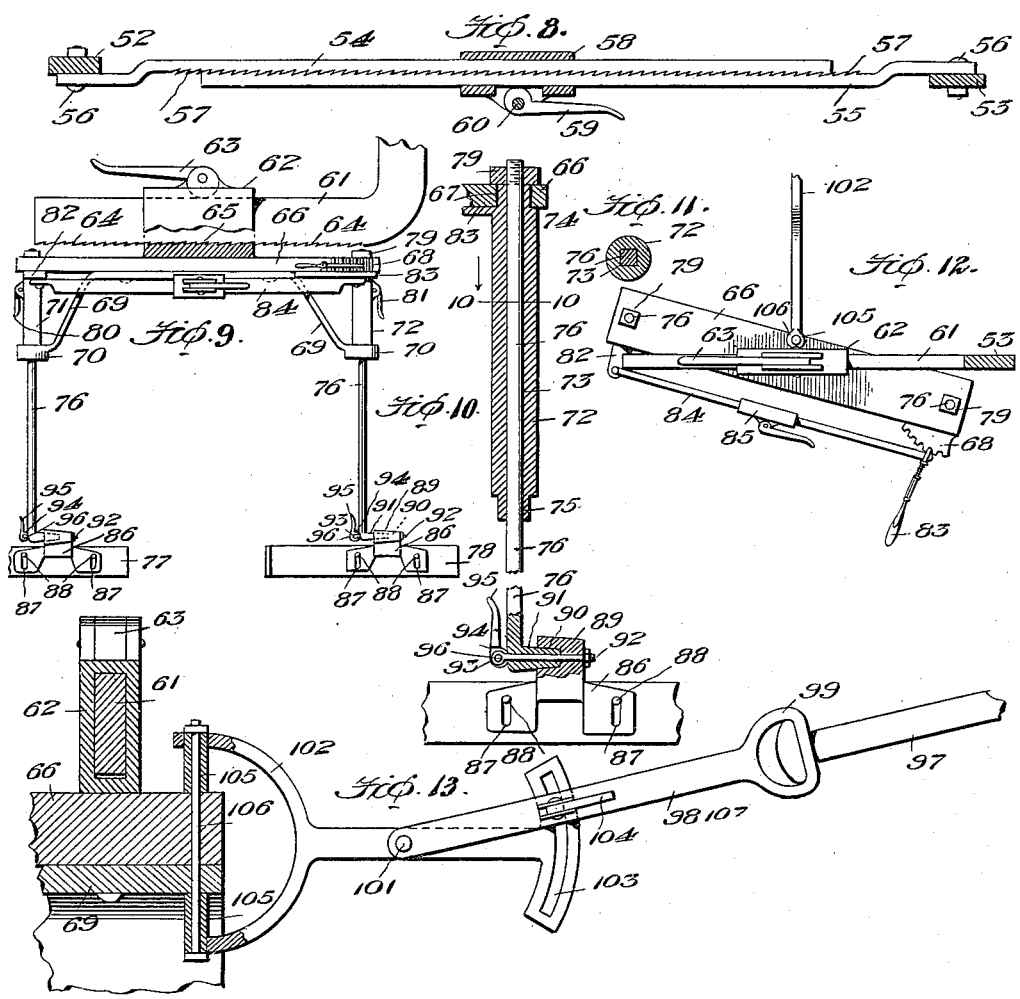
WITNESSES
INVENTOR
Jesse L. Graham
by his Attorney

UNITED STATES PATENT OFFICE.

JESSE L. GRAHAM, OF PRINCETON, IOWA.

CULTIVATOR.

1,132,842.  Specification of Letters Patent.  Patented Mar. 23, 1915.

Application filed June 3, 1912. Serial No. 701,263.

*To all whom it may concern:*

Be it known that I, JESSE L. GRAHAM, a citizen of the United States, residing at Princeton, county of Scott, and State of Iowa, have invented certain new and useful Improvements in Cultivators, of which the following is a specification.

This invention relates to cultivators.

My object is to provide, first, a cultivator having new means for connecting the cultivating implements to the machine and for raising, lowering and guiding the cultivating implements in relation to the machine and to the rows of hills; second, to provide, in a cultivator, novel means for connecting the plows, shovels or gangs together, so that they may be simultaneously or independently turned without requiring the use of a wrench; third, to provide, in a cultivator, an improved adjustable connection between the arches for the gangs, whereby different adjustments and positioning of the parts may be readily effected according to the nature of the cultivation to be carried on.

One embodiment of the invention is set forth fully hereinafter and disclosed in the accompanying drawings, in which—

Figure 1 is a plan view showing so much of a wheeled cultivator as will disclose how my invention is applied thereto; Fig. 2, a side elevation of the parts shown in Fig. 1; Fig. 3, a rear end elevation; Fig. 4, a detail perspective of the supporting, elevating and lowering means for the cultivating devices; Fig. 5, a detail of two of the levers of Fig. 4; Fig. 6, a rear elevation of a part of the hitch or draft bar; Fig. 7, a plan thereof; Fig. 8, a detail plan, with parts in section, of the connecting device between the arches; Fig. 9, a rear elevation partially in section, of a gang of shovels and the means for connecting them to an arch and for their adjustment; Fig. 10, a longitudinal section through one of the holders for a shovel shank of Fig. 9; and also showing the means for connecting the shovel to its shank; Fig. 11, a cross section on line 10—10, Fig. 10; Fig. 12, a plan view of the devices of Fig. 9; and Fig. 13, a detail view with parts in section, showing one of the draft devices.

The cultivator frame is shown at 1 and its wheels at 8.

The cultivator has inner and outer frame members 1 and 2, preferably of angle iron, which are connected by braces 3 at the front and by braces 4 at the rear.

The frame members 1 are extended rearwardly and connected by a brace 23 which also serves as a track, said brace having a flat top. Each extension of the frame 1 is provided with rollers 24 adapted to turn on vertical axes and rollers 25 positioned to rotate on a horizontal axis. Resting upon the respective rollers 25 and bearing against the respective rollers 24 are the tubular sleeves 26 and 27, and extending centrally thereof is a shaft or rod 28. Secured to the shaft 28 are segments 29 and 30. Loose on the shaft 28 are levers 31 and 32 having suitable latch mechanism adapted to engage with the segments 29 and 30 to lock the levers in different positions. The levers are provided with projecting sleeve parts 33 and 34 adapted to be engaged with chains 35 and 36 for connection to the inner gangs of cultivating devices as will appear more fully hereinafter. Secured to the sleeves 26 and 27 are levers 37 and 38 which have suitable latch mechanism adapted to engage the respective segments 29 and 30, whereby the sleeves 26 and 27 may be locked in different positions to which they may be turned. The sleeves 26 and 27 have sleeve parts 39 and 40 adapted to be engaged by chains 41 and 42 which are adapted to be connected to the outside gangs of cultivating devices, as will appear more fully hereinafter.

Fastened to the shaft 28 is an arm 43 which is provided with a roller 44 adapted to rest on the brace and support 23. Pivoted to the arm 43 is a leg 45 which is drawn upwardly by a spring 46 connecting it to the arm 43 and it has a roller 47 which is adapted to bear upon the brace and support 23 when suitably positioned. The leg 45 is controlled by a pull-rod 48 arranged for convenient operation from the seat 19. If the roller 47 is raised upon the brace and support 23, the roller 44 and the arm 43 will be elevated. The cultivator gangs will then be in raised position. On operating the pull-rod 48, the roller 47 may be drawn backwardly off the brace and support 23, whereupon the arm 43 will fall and the roller 44 will rest upon the brace and support 23. The cultivator gangs will then be in lowered position. Whichever of the rollers 44—47 is resting upon the brace and support 23, the entire supporting and connecting means for the cultivator gangs, embodying the shaft 28 and the sleeves 26 and 27, the levers, etc., may move crosswise of the machine with little friction due to the employment of the rollers 24—25 and the travel of the roller 44 on the support 23, and consequently, the operator may move the gangs with his feet to the right or left to satisfy conditions of the ground and according to the nature of the cultivation which he desires to carry on.

Beneath the frame are rollers 49 whose axes are arranged horizontally and pairs of rollers 50 whose axes are arranged vertically, the rollers being sustained from the frame. Resting upon the rollers 49 and guided by the rollers 50, is a hitch bar 51 for the connection of the gangs of cultivating devices, as will presently appear, so that the draft on the cultivating devices and their suspension by the chains 35, 36, 41 and 42, enables the cultivating gangs to shift laterally and thus work straight with the rows.

The cultivating devices, such as shovels presently described, are supported by arches 52 and 53 to which the chains 41 and 42 connect. The arches are connected by a two-part bar, the ends of whose members 54 and 55 are pivoted to the arches at 56, thus enabling the arches to tilt or swing vertically in relation to each other while at the same time mutually bracing them and preventing them from interfering with each other's action or one set of gangs of shovels interfering with another set thereof. The adjacent faces of the members 54 and 55 are provided with serrations or teeth 57 whose teeth are inclined in such manner that any tendency of the arches 52 and 53 to separate or pull apart will tend to more tightly lock the clamp, Fig. 8, used to secure them. The clamp, Fig. 7, consists of a boxing 58 embracing the serrated parts of the members 54 and 55 and an eccentric clamp 59 pivoted thereto at 60, the eccentric head of the clamp bearing against one of the members, whereby the serrated parts of the members are locked together. On throwing the handle of the clamp back, any desired adjustment to take up or let out the members 54 and 55 may be obtained.

Receiving the lateral extensions 61 of the arches are clamp boxes 62 having eccentric clamps 63 similar in every way to the eccentric clamps 59 and coöperating with the extension 61 to clamp the boxes 62 thereto. The lower edges of the extension 61 have serrations 64 and on the inside of the bottom of each box 62 are corresponding serrations 65 adapted to engage therewith, whereby the box is securely held where clamped. Cast integral with each clamp box 62 is a horizontal brace or plate 66 having round holes 67 therein. Rigidly secured to or cast integral with the plate 66 is a segment 68. Bolted to plate 66 is an arm 69 having round eyes 70 at its ends. The shovel holders 71 and 72 have a square hole 73 extending therethrough from end to end. At their opposite ends they are provided with round parts 74 and 75, the former being rotatably received in the holes 67 and the latter rotatably received in the eyes 70. Extending through and fitting the square openings 73 are the shanks 76 of the shovels 77 and 78, the upper ends of the shanks 76 being provided with screw-threads and receiving nuts 79 by which the shanks 76 are prevented from dropping out of the holders 71 and 72. The holders 71 and 72 are provided with eccentric clamps 80 and 81 corresponding to the clamps 59, the eccentric heads of the clamps being pivoted to the holders and working through slots therein and adapted to directly bear against the shanks 76. The mounting for the shanks 76 and the holders 71 and 72 is such that the holders and the shanks carried thereby may be turned as desired. Secured to or cast integral with the holder 71 is an arm 82. Secured to or cast integral with the holder 72 is a lever 83 which is provided with a latch adapted to engage the segment 68. Pivotally connecting the arm 82 and lever 83 is a jointed brace and connector 84 whose parts are similar to the parts 54, 55 and 57 and which are adapted to be clamped together by an eccentric clamp 85 similar to the eccentric clamp 59.

By unlatching the lever 83 from the segment 68, the holders 71 and 72 may be simultaneously turned to maintain the parallelism of the shovels 77 and 78, but to vary their inclinations in reference to the row. On releasing the clamp 85, the parts of the connecting bar 84, will be released from each other and either of the shovels 77, 78, may then be grasped by its heel and, with its holder, 71 or 72, turned in either direction to cause it to draw either more nearly parallel with the row or more at an angle thereto. The clamp 85 can then be re-locked.

Referring to Figs. 9 and 10, the shovels 77 and 78 have an adjustable connection with their shanks 76 by which they may be tilted upwardly and downwardly to cause their toes to dig more or less deeply into the earth. At 86 is a plate having elongated slots 87 through which pass bolts 88 connecting the plate to the shovel. The slots and bolts permit tilting the shovel as may be desired. Cast integral with the plate 86 is a socket 89 having a conical interior 90 which receives a conical foot 91 on the shank 76. A hole extends through the foot 91 and a bolt 92 which passes through said hole, also passes through the end of the socket 89 and is provided with a nut for regulating the adjustment. The other end of the bolt 92 has an eye 93 which is received in the bifurcated end 94 of an eccentric clamp 95 and is connected thereto by a cross pin or bolt 96.

When the eccentric clamp 95 is suitably positioned, the socket 89 is wedged onto the foot 91, and the shovel is firmly held. On swinging the clamp 95 in the opposite direction, the socket is released from the foot 91 and the shovel can then be swung one way or the other sidewise to regulate the angle of its general plane or extent to the soil, after which the clamp may be locked.

The clamp 59 and associated devices provide means whereby the arches 52 and 53 may be spaced nearer to or farther away from each other; the pivots 56 permit the arches and the gangs of shovels carried thereby to oscillate or relatively move as may be necessary according to the cultivation that is necessary; the clamps 63 and their associated devices afford means for shifting a gang of shovels on its own arch so that the gangs of the different arches may be moved toward or away from each other to meet requirements; the clamps 80, 81 and associated means permit the shovels to be arranged at any desired angles initially, considered in the direction of travel of the machine; the parts 82, 83, 68, 84 and 85 afford means whereby the shovels may be swung to different angles in relation to the direction of travel or one shovel of a gang may be arranged in any desired relation to the other shovel thereof; and the clamps 95 and associated means permit the positioning of the toes of the shovels as desired and the slant of the shovels to be regulated as may be found necessary.

The part 97 has an eye which receives the hitch bar or rod 51 and is prevented from sliding thereon by spring cotters or other devices 100. The members 98 are pivoted at 101 to a yoke 102 which has a slotted segment 103 to which the part 98 may be clamped at any desired position by a clamp 104 similar to the clamp 59. This construction enables the shovels to be set so that their toes will point into the ground or point out. The arms of the yoke 102 have holes which receive spools 105 loosely surrounding a bolt 106. The spools or sleeves 105 are adapted to bear against the plate 66 and the member 69, the bolt 106 passing through the two, thereby assisting in holding the parts 66 and 69 together, while the bolt 106 forms a connection with the plate 66 and hence with the arch 52 or 53, whereby the arches are hitched to the bar 51. The spools or sleeves 105 permit oscillation of the yokes 102 in relation to the parts 66 and 69. Preferably, two draft devices of the character set forth will be provided for each of the arches.

Having thus described my invention, what I claim as new and desire to secure by Letters Patent, is:—

1. In a cultivator, the combination with the cultivator frame, of cultivating devices, draft means connecting the cultivating devices to the cultivator frame and arranged to shift as an entirety transversely of said frame, and raising and lowering means connecting the cultivating devices to the cultivator frame which are also shiftable transversely thereof with the draft means.

2. In a cultivator, the combination with the cultivator frame, of a hitch or draft bar adapted to slide or move as an entirety transversely of the cultivator frame, independent cultivating devices connected independently to said hitch or draft bar at different points of the length thereof by dragging devices, said cultivating devices being adapted to shift bodily transversely of the cultivator with said hitch or draft bar, rollers supporting the draft bar, and rollers against which the draft bar bears.

3. In a cultivator, the combination with the frame thereof, of independent cultivating devices, means connecting said devices to the frame, and raising and lowering means for said cultivating devices embodying inner and outer telescoped shafts adapted to slide together as an entirety transversely of the frame, independent means for turning said shafts and locking them, and connections between the shafts and the respective cultivating devices.

4. In a cultivator, the combination with the frame thereof, of independent cultivating devices, means connecting said devices to the frame, raising and lowering means for said cultivating devices embodying inner and outer telescoped shafts adapted to slide together as an entirety transversely of the frame, connections between the shafts and the respective cultivating devices, means on the frame supporting said shafts so that they may shift or slide together as an entirety transversely thereof, means for preventing backward turning of the shafts, and independent means for turning the shafts, whereby the cultivating devices may be independently raised or lowered.

5. In a cultivator, the combination with the frame, of a cultivating device connected thereto, a rotatable shaft mounted on the frame to slide transversely thereof, means for turning said shaft and for locking it where turned, and an operative connection between the shaft and the cultivating device whereby the cultivating device may be raised or lowered.

6. In a cultivator, the combination with the frame, of telescoped shafts both mounted on the frame to slide as an entirety transversely thereof, means for preventing one of the shafts from turning, a lever for turning the other shaft, means for locking the lever, a cultivating device connected to the frame, and a connection between the cultivating device and the lever-operated shaft.

7. In a cultivator, the combination with the frame thereof, of a shaft mounted to shift transversely of said frame, a support on the frame, an arm connected to the shaft and adapted to bear against and slide upon said support, a member movably connected to the said arm which is also adapted to rest against and slide upon the support when the arm is raised, a shaft telescoped over the shaft first-named and adapted to turn thereon, means for turning said last-named shaft and for locking it where positioned, a cultivating device connected to the frame, and a connection between the cultivating device and the shaft last-named.

8. In a cultivator, the combination with the frame thereof, of sleeve shafts mounted to turn and to slide transversely thereof, a shaft arranged within the sleeve shafts and bodily slidable transversely in relation to the frame with said sleeve shafts, segments on the inner shaft, levers loose on the inner shaft and having latching means adapted to engage with the segments, cultivating devices connected to the frame, connections between certain of the cultivating devices and the levers aforesaid, connections between other cultivating devices and the sleeve shafts aforesaid, levers connected to the sleeve shafts and having latching means adapted to engage the segments aforesaid, and means for supporting the inner shaft against turning.

9. In a cultivator, the combination with the frame thereof, of sleeve shafts mounted to turn and to slide transversely thereof, a shaft arranged within the sleeve shafts and slidable transversely of the frame therewith, segments on the inner shaft, levers loose on the inner shaft and having latching means adapted to engage with the segments, cultivating devices connected to the frame, connections between certain of the cultivating devices and the levers aforesaid, connections between other cultivating devices and the sleeve shafts aforesaid, levers connected to the sleeve shafts and having latching means adapted to engage the segments aforesaid, a support on the frame, an arm secured to the inner shaft and resting upon said support, a member movably connected to the arm which may be made to rest upon the support when the arm is raised, and means for shifting said movable member.

10. In a cultivator, the combination with independently suspended arches having laterally extending arms, of a connection between said arches which keeps them separate but permits their relative up and down movement, and cultivating devices having adjustable connections to the respective arch arms, whereby the cultivating devices suspended by the arches may be adjusted toward and away from each other along said arch arms.

11. In a cultivator, the combination with cultivator units each having an axially rotatable stem, of a direct connection between said stems, a manually operable device for simultaneously turning at will said stems through the medium of the connection aforesaid, and means for locking the units after such turning.

12. In a cultivator, the combination with cultivator units each having an axially rotatable stem, of a direct adjustable connection between said stems whereby they may be initially relatively adjusted and maintained in such relative adjustment, a manually operable device for simultaneously turning at will said stems through the medium of the adjustable connection aforesaid, and means for locking the units after such turning.

13. In a cultivator, the combination with a plurality of cultivator units each having an axially rotatable stem, of a detachable connection between the said stems, whereby they may be simultaneously turned when coupled together thereby, said stems being independently rotatable when said connection is released, and means for locking the stems after their joint adjustment.

14. In a cultivator, the combination with a plurality of cultivator units each having an axially rotatable stem, of a detachable and adjustable connection between the said stems, whereby they may be simultaneously turned when coupled together thereby in any desired relative adjustment, said stems being independently rotatable when said connection is released, and means for locking the stems after their joint adjustment.

15. In a cultivator, the combination of a plurality of cultivator units, each having an axially rotatable stem, of a connection between said stems, whereby they may be simultaneously turned, means for locking said stems after such turning, and adjustable connections between the cultivator units and their stems, whereby they may be angularly adjusted independently of their rotary adjustment by the stems as aforesaid.

In testimony whereof, I hereunto affix my signature in presence of two witnesses.

JESSE L. GRAHAM.

Witnesses:
 John A. Phelps,
 M. L. Hire.

Copies of this patent may be obtained for five cents each, by addressing the "Commissioner of Patents, Washington, D. C."